United States Patent
Applegate

[11] 3,974,837
[45] Aug. 17, 1976

[54] CROP COMBINE WITH A RESILIENTLY MOUNTED CROP SEPARATOR

[76] Inventor: Paul A. Applegate, R.R. 4, Box 323, Brookville, Ind. 47012

[22] Filed: Mar. 3, 1975

[21] Appl. No.: 554,735

[52] U.S. Cl. .............................................. 130/27 S
[51] Int. Cl.² ......................................... A01F 12/28
[58] Field of Search ............ 56/14.5, 14.6, 122–125; 130/27 R, 27 J, 27 JT, 27 K, 127 L, 27 P, 27 Q, 27 S

[56] References Cited
UNITED STATES PATENTS

| | | | |
|---|---|---|---|
| 509,490 | 11/1893 | Richter | 130/27 S |
| 740,215 | 9/1903 | Bartholow | 130/27 S |
| 1,857,265 | 5/1932 | Stephens | 130/27 S |
| 2,484,228 | 10/1949 | Isay | 130/27 S X |
| 3,547,129 | 12/1970 | Hirsch | 130/27 R |

*Primary Examiner*—Russell R. Kinsey
*Attorney, Agent, or Firm*—Woodard, Weikart Emhardt & Naughton

[57] ABSTRACT

A resiliently mounted crop separator for a combine allowing stones to pass therethrough without damage to the separator. A combine vehicle includes gathering means to gather a crop and further includes conveying means to convey the crop from the gathering means. A cylinder rotatably mounted in the combine is spaced apart from a concave frame between which the grain may be separated from the plant. The opposite sides of the rear end portion of the concave frame are resiliently mounted to the combine frame. In addition, the front edge portion of the concave frame is resiliently mounted to the combine frame. Foreign objects having thicknesses greater than the spacing between the cylinder and concave frame when passing between the concave frame and cylinder will force the concave frame away from the cylinder thereby preventing damage by the foreign objects to the cylinder or concave frame. A pair of threaded rods are connected by a pair of brackets to the rear edge portion of the concave frame. The threaded rods extend through a second pair of brackets attached to the combine frame with each threaded rod extending through a coiled spring urging the first pair of brackets apart from the second pair of brackets and urging the concave frame to a first position. The coiled springs are yieldable to allow the first pair of brackets to move toward the second pair of brackets and the concave frame to move to a second position. The front edge portion of the concave frame is attached to a crank arm spaced apart from a control arm movably mounted to the combine frame. A coiled spring spaces the control arm apart from the crank arm but is yieldable to allow movement of the crank arm and the concave frame.

3 Claims, 3 Drawing Figures

CROP COMBINE WITH A RESILIENTLY MOUNTED CROP SEPARATOR

BACKGROUND OF THE INVENTION

1. Field of the Invention

This invention is in the field of farm implements.

2. Description of the Prior Art

International Harvester Company, 401 North Michigan Avenue, Chicago, Illinois 60611, produces the farm implement known as International 815 Combine. The combine may be used as a grain cutting machine or as a pick-up machine. Likewise, it may be used as an efficient corn harvesting machine. The combine includes a separator for the purpose of separating the cut grain from the cut plant. The separator includes a rotating cylinder spaced apart from a concave screen frame.

Frequently, when harvesting a crop, a variety of foreign objects, such as stones, will be swept into the combine and conveyed upwardly toward the separator. Various types of stone retarders such as small fences are provided within the combine to reduce the number of stones reaching the separator. Nevertheless, many stones may eventually reach the separator and cause damage thereto. The previously mentioned rotating cylinder is spaced a relatively small distance apart from the concave frame in order to trap the crop therebetween and separate the cut grain from the cut plant. For example, the cylinder may be spaced apart from the concave frame by a distance of one-sixteenth of an inch to 1-½ inches. Thus, when a large stone passes therebetween the stone will damage the normally immovable concave frame and rotating cylinder. Crop combines are quite expensive costing tens of thousands of dollars. Likewise, the various components required for a crop combine are both expensive to procure and to install. I have therefore devised a new and improved mounting structure for the concave frame to allow the frame to resiliently move away from the cylinder whenever a hard foreign object such as a stone becomes trapped therebetween thereby preventing damage to the cylinder or concave frame.

SUMMARY OF THE INVENTION

One embodiment of the present invention is in a combine including a main frame, power means mounted on the main frame operable to propel the combine, gathering means mounted on the frame operable to gather crops from land, conveying means mounted on the frame and positioned adjacent the gathering means operable to convey the crop from the gathering means, a separator including a cylinder rotatably mounted on the frame adjacent the conveying means, the separator further including means operable to rotate the cylinder, the separator further including a concave frame mounted on the main frame and extending at least partially around the cylinder being spaced apart a first distance from the cylinder to receive the crop therebetween from the conveying means, wherein the improvement comprises mounting means connected to the concave frame and resiliently connected to the main frame being operable to allow the concave frame to resiliently move to and from the cylinder, the concave frame moves away from the cylinder as a foreign object having thickness greater than the first distance moves between the cylinder and the concave frame.

It is an object of the present invention to provide means for preventing damage to a separator within a crop combine vehicle whenever a foreign object such as a stone passes into the separator.

A further object of the present invention is to provide a new and improved mounting for the concave frame of a combine separator.

Related objects and advantages of the present invention will be apparent from the following description.

DESCRIPTION OF THE PREFERRED EMBODIMENT

Figure 1:
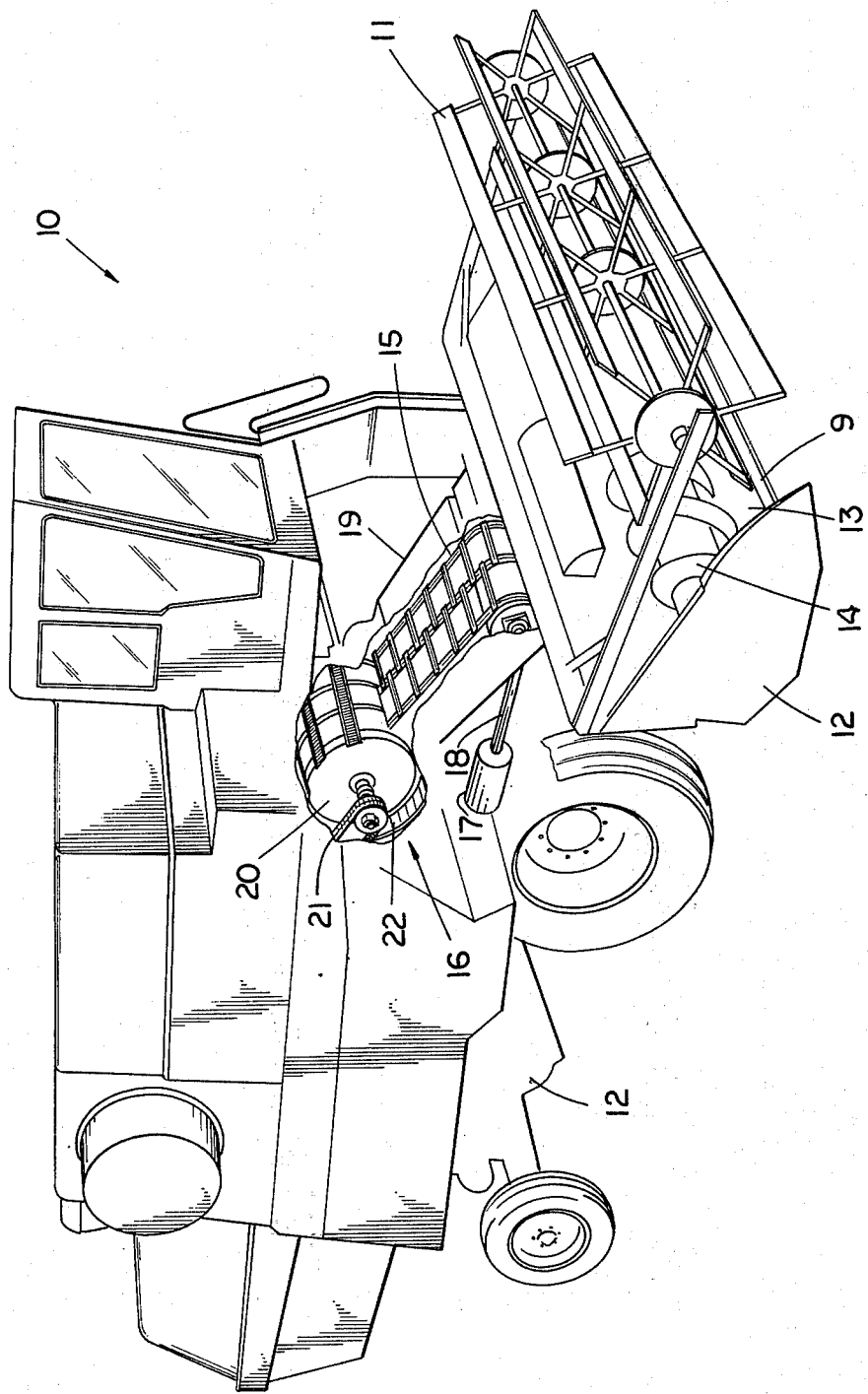
FIG. 1 is a fragmentary perspective view of a combine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a combine 10 for harvesting a crop. Such a combine is produced by International Harvester Company, 401 North Michigan Avenue, Chicago, Illinois 60611, under Model No. International 815 Combine. The International 815 Combine is disclosed in the operator's manual published by International Harvester under the title "Operator's Manual International 815 Combine, Operation, Maintenance, Lubrication" which is hereby incorporated by reference and having a publication number thereon of 1012761R1, Rev. 1, 8-70.

Combine 10 includes a reel 11 rotatably mounted to the frame 12 of the combine. Reel 11 sweeps the crop cut by knife 9 onto the platform 13 of the combine. Suitable power means such as an internal combustion engine mounted to frame 12 is provided to propel the combine across the field. Likewise, power means are provided for rotating and driving the various reels, augers, belts, cylinders and beaters within the combine. Reel 11 plus platform 13 provide gathering means operable to gather the crop from the land.

A rotatably mounted auger 14 delivers the cut grain to the conveying means 15 which includes a continuous belt conveying the cut grain to the separator 16. Hydraulic power cylinders 17 are mounted to frame 12 having extendable piston rods 18 connected to the frame 19 of the conveying means to lift the conveying means 15 and platform 13 upwardly.

Separator 16 includes a cylinder 20 rotatably mounted to frame 12. An endless chain 21 is engaged with a sprocket mounted to cylinder 20 with chain 21 engaged with a suitable driver for rotating cylinder 20 at the desired speed. A concave frame 22 is mounted to frame 12 and is spaced apart from cylinder 20 to allow the cut grain to pass between the concave frame and cylinder. The cut grain is rubbed out of the head of the grain between the rotating cylinder 20 and the concave grate or frame 22. The separated grain then eventually passes to a storage bin.

Cylinder 20 is located immediately adjacent the conveyor 15 to receive therefrom the cut grain. Concave frame 22 extends partially around the cylinder and is spaced therefrom a specified distance.

Figure 2:
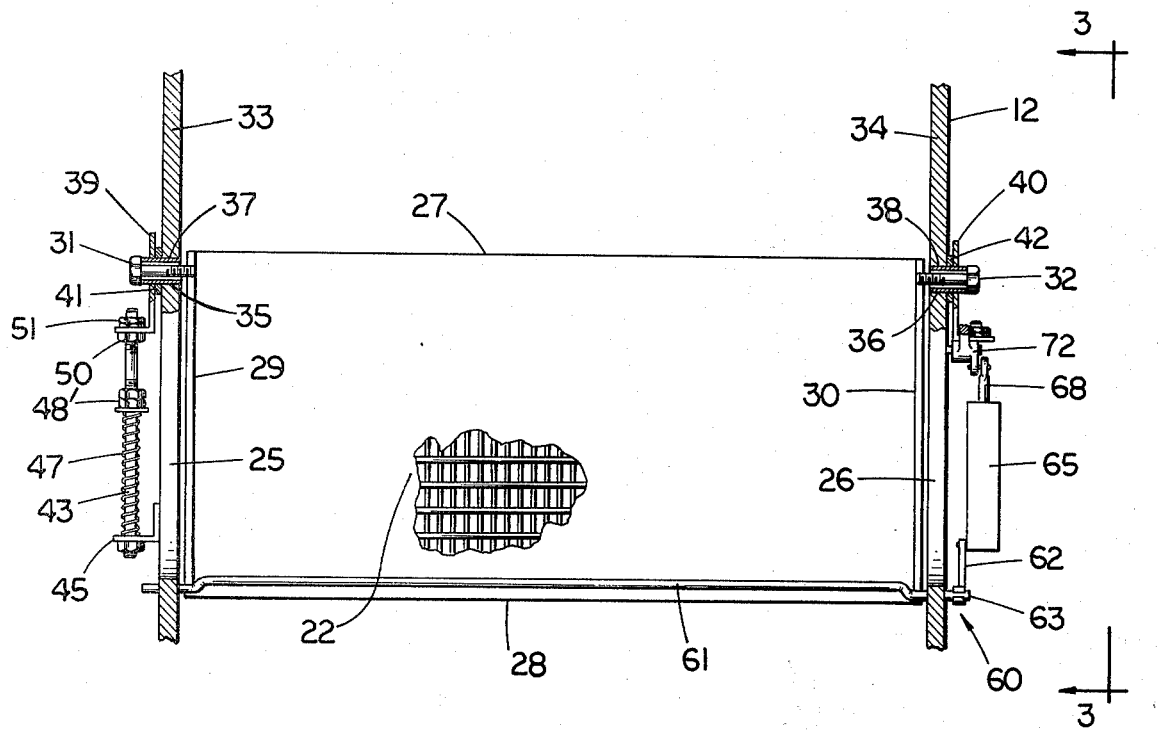
FIG. 2 is an enlarged perspective front view of the separator shown in the combine of FIG. 1.

Rotating cylinder 20 has been removed from FIG. 2 to more clearly illustrate concave frame 22. The concave frame includes a plurality of wires forming a screen. The combine frame 12 extends on the opposite sides of the concave frame and includes a pair of recesses 25 and 26 to receive the opposite ends of the rotating cylinder.

Figure 3:
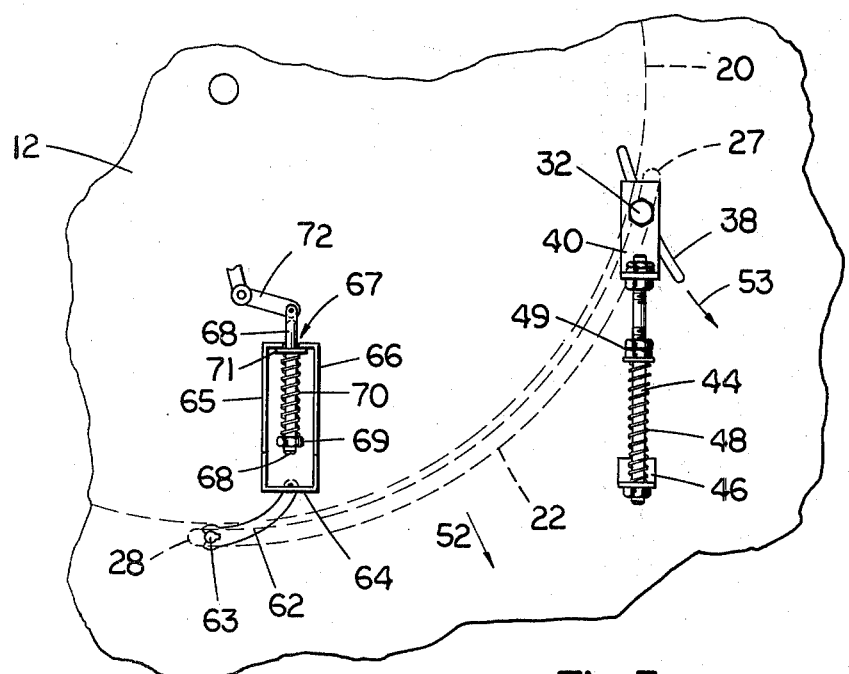
FIG. 3 is an enlarged fragmentary side view looking in the direction of arrows 3—3 of FIG. 2.

Concave frame 22 includes a top rear edge portion 27 and a lower front edge portion 28. The opposite sides 29 and 30 are respectively attached to a pair of bolts 31 and 32 which extend freely through respectively the opposite sidewalls 33 and 34 of frame 12. A pair of sleeves 35 and 36 are located respectively in apertures 37 and 38 of sidewalls 33 and 34 spacing the heads of bolts 31 and 32 apart from walls 33 and 34. A pair of right angle brackets 39 and 40 are mounted to walls 33 and 34 by bolts 31 and 32. The undersurface of the head of each bolt 31 and 32 abuts respectively sleeves 35 and 36 spacing the bolt heads away from brackets 39 and 40. A pair of washers 41 and 42 are positioned between the right angle brackets and sidewalls. Apertures 37 and 38 form slots through which the bolts may slide. For example, aperture 38 is shown in FIG. 3 as a slot with bolt 32 projecting therethrough. A similar slot is provided in wall 33 for receiving bolt 31.

A pair of threaded rods 43 and 44 respectively extend through the bottom flange portion of brackets 39 and 40 and in addition respectively extend through a second pair of right angle brackets 45 and 46 fixedly attached respectively to sidewalls 33 and 34. Each threaded rod extends respectively through coiled springs 47 and 48 which have bottom ends abutting respectively brackets 45 and 46. Each threaded rod has a pair of nuts threaded thereon to engage the top end of the coiled spring. For example, rod 43 is provided with a pair of nuts 48' positioned between brackets 39 and 45 to limit movement of the top end of coiled spring 47. Likewise, two additional nuts 49 are provided on threaded rod 44. Thus, coiled spring 47 is positioned between nuts 48' and bracket 45 whereas threaded rod 44 is positioned between nuts 49 and bracket 46. Nuts 48' and 49 may be adjusted upward or downward to control the amount of compression applied to coiled springs 47 and 48. Additional nuts are provided on each threaded rod to limit movement of the threaded rods and brackets 39 and 40. For example, a single nut 50 is threaded on rod 43 abuttingly engaging the bottom surface of bracket 39 whereas two additional nuts 51 are threaded to the top end of rod 43 engaging the top surface of bracket 39.

In the event a foreign object such as a stone is conveyed upwardly by conveyor 15 into separator 16, and in the event that the thickness of the foreign object is greater than the normal spacing between the rotating cylinder and concave frame, then the frame will resiliently move away from the rotating cylinder. For example, concave frame 22 (FIG. 3) will move in the direction of arrow 52 thereby causing each bolt 31 and 32 to move within slots 37 and 38 in the direction of arrow 53 increasing the spacing between the concave frame and cylinder. As bolts 31 and 32 move in the direction of arrow 53, the head of each threaded rod 43 and 44 will move away from brackets 45 and 46 compressing coiled springs 47 and 48, thereby allowing bolts 31 and 32 along with brackets 39 and 40 to move in the direction of arrow 53. Once the foreign object has passed through the separator, then coiled springs 47 and 48 will return the heads of threaded rods 43 and 44 against brackets 45 and 46 so as to return bolts 31 and 32 along with the top edge portion 27 of concave frame 22 to the original position. Springs 47 and 48 are not compressed sufficiently by nuts 48' and 49 to cause top edge 27 to impact the rotating cylinder 20.

By resiliently mounting the rear edge portion of the concave frame by means of the threaded rods and springs heretofore discussed, damage via a foreign object to the concave frame and rotating cylinder is avoided. The springs are biased against the nuts 48' and 49 threaded on the rods so as to normally urge the rods to a first position with the coiled springs being yieldable to allow the rods and concave frame to move to a second position. Washers 41 and 42 prevent the right angle brackets 39 and 40 from rubbing against walls 33 and 34 and therefore allow bolts 31 and 32 to slide the length of the slots if required to achieve a suitable spacing between the concave frame and rotating cylinder. The coiled springs urge brackets 45 and 46 apart from brackets 39 and 40.

The forward edge portion 28 of concave frame 22 is also resiliently mounted to the combine frame. The front edge portion of the concave frame therefore is allowed to resiliently move to and from the rotating cylinder.

Crank arm 60 is pivotally mounted to sidewalls 33 and 34 with the front edge portion 28 extending wrappingly around rod 61 of crank arm 60. Rod 61 is offset from lever 62 and end 63 of rod 61. Thus, by imparting pivoting motion to lever 62 and by therefore rotating end 63, an eccentric movement is applied to the main portion of rod 61 thereby also applying an eccentric movement to the forward edge portion 28 of the concave frame moving the front edge portion 28 to or from the rotating cylinder. Lever 62 is pivotally attached to a U-shaped member 64 in turn fixedly attached to a pair of legs 65 and 66 joined at their top ends and provided with an aperture 67 through which a threaded rod 68 extends. The bottom end of rod 68 threadedly receives nut 69. Threaded rod 68 extends through coiled spring 70 having a bottom end engaging nut 69 and a top end engaging washer 71 abutting the inside surface of the top ends of legs 65 and 66 adjacent aperture 67. The top end of rod 68 is pivotally attached to a control arm 72 extending into the cab of the combine. The operator may therefore pivot control arm 72 so as to cause downward or upward movement of rod 68 in turn causing downward or upward movement of legs 65 and 66 and imparting pivoting movement to crank arm 62 thereby moving the forward edge portion of the concave frame either to or from the rotating cylinder. Nut 69 may be adjusted upward or downward to control the amount of force applied to the coiled spring 70. Likewise, the front edge portion 28 will move away from cylinder 20 when a foreign object having a thickness greater than the normal spacing between the cylinder 20 and concave frame 22 passes therebetween.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. In a combine including a main frame, power means mounted on said main frame operable to propel said combine, gathering means mounted on said frame operable to gather crops from land, conveying means mounted on said frame and positioned adjacent said gathering means operable to convey said crop from said gathering means, a separator including a cylinder rotatably mounted on said frame adjacent said conveying means, said separator further including means operable to rotate said cylinder, said separator further including a concave frame mounted on said main frame and extending at least partially around said cylinder being spaced apart a first distance from said cylinder to receive said crop therebetween from said conveying means, mounting means connected to said concave frame and resiliently connected to said main frame being operable to allow said concave frame to resiliently move to and from said cylinder, said concave frame moves away from said cylinder as a foreign object having a thickness greater than said first distance moves between said cylinder and said concave frame; wherein the improvement comprises:

said concave frame includes a rear edge portion and a front edge portion, said mounting means includes first means resiliently connected to said main frame and connected to said rear edge portion of said concave frame operable to allow said rear edge portion of said concave frame to resiliently move to and from said cylinder;

said mounting means includes second means resiliently connected to said main frame and connected to said front edge portion of said concave frame operable to allow said front edge portion of said main frame to resiliently move to and from said cylinder;

said combine includes a control arm connected to said second means to allow manual movement of said front end portion of said concave frame;

said second means includes a crank arm mounted to said main frame and connected to said front edge portion of said concave frame, said second means includes a threaded rod connected to said control arm, said second means further includes a coiled spring through which said threaded rod extends, said spring extending between and urging apart said crank arm and said control arm, said second means further includes an offset rod with a main rod portion mounted to said front edge portion of said concave frame, said offset rod has opposite ends offset from said main rod portion with said ends pivotally mounted on said main frame with one of said ends connected to said crank arm providing eccentric movement of said main rod portion and said front edge portion as said crank arm pivots.

2. In the combine of claim 1 wherein:

said first means includes a first rod mounted to said concave frame and to said main frame and further including first spring means biased against said first rod normally urging said first rod and said concave frame to a first position but being yieldable to allow said first rod and said concave frame to move to a second position.

3. In the combine of claim 1 wherein:

said second means includes a housing to which said crank arm is connected with said threaded rod projecting freely into said housing locating said spring within said housing, said housing limiting movement of said spring therefrom.

* * * * *